Oct. 9, 1934.　　　C. J. KOTCHI　　　1,976,026
METHOD OF MANUFACTURING FLUX CARRYING RODS OR WIRE
Original Filed Oct. 31, 1927　　4 Sheets-Sheet 1
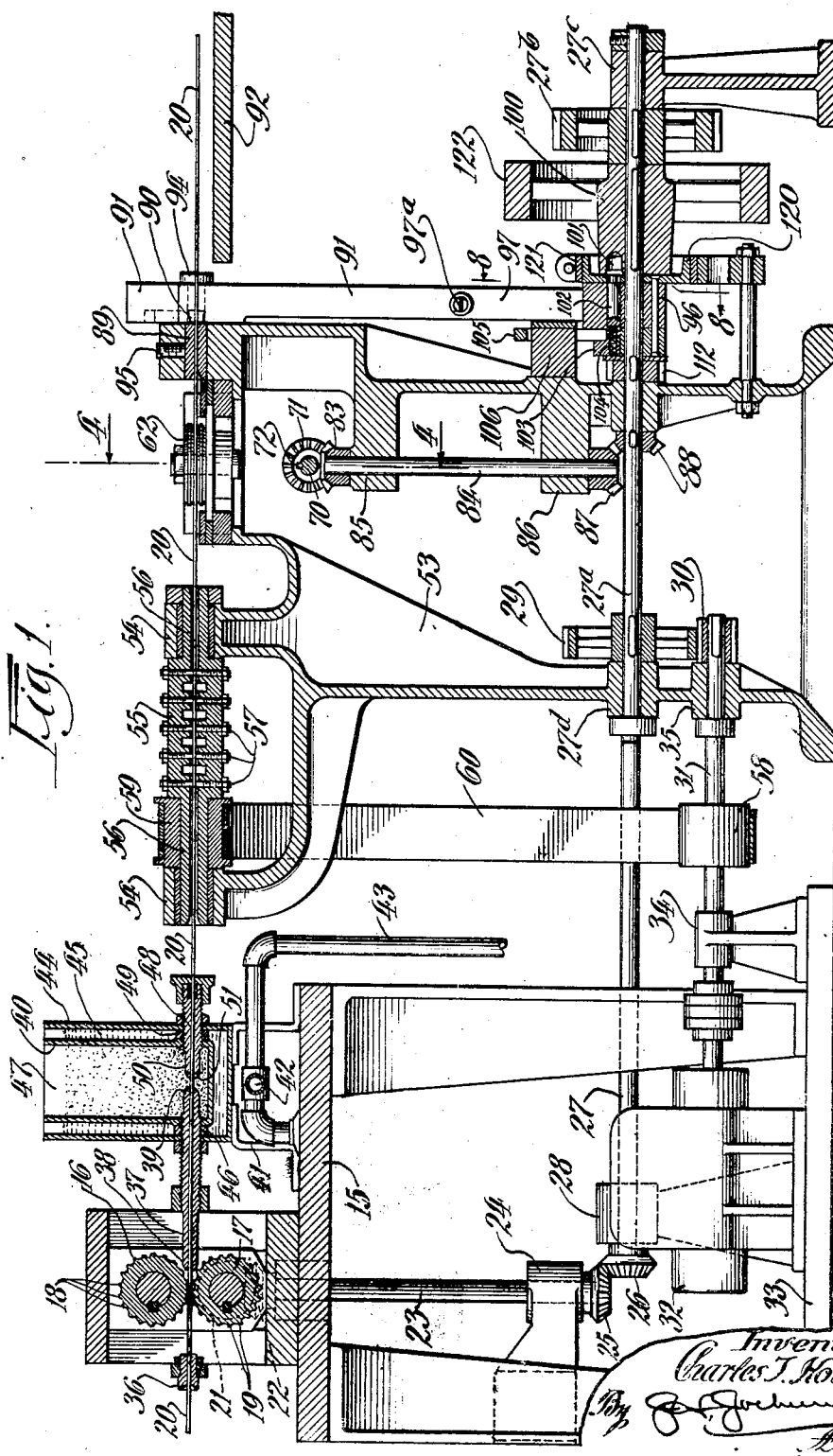
Inventor:
Charles J. Kotchi Oct. 9, 1934.　　　C. J. KOTCHI　　　1,976,026
METHOD OF MANUFACTURING FLUX CARRYING RODS OR WIRE
Original Filed Oct. 31, 1927　　4 Sheets-Sheet 2
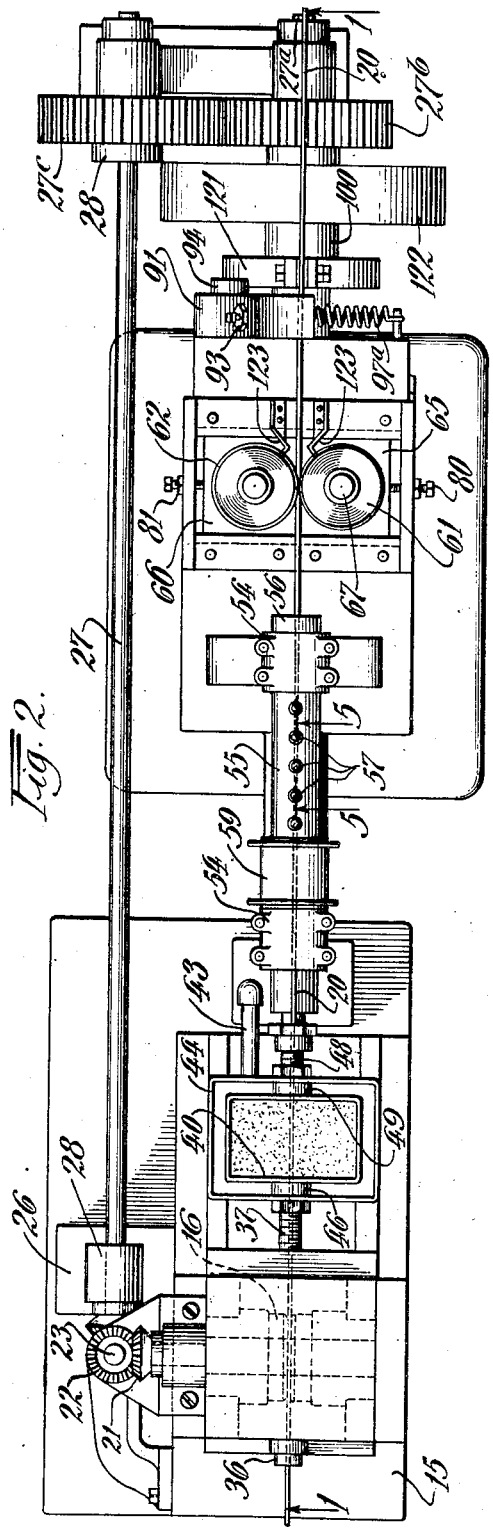
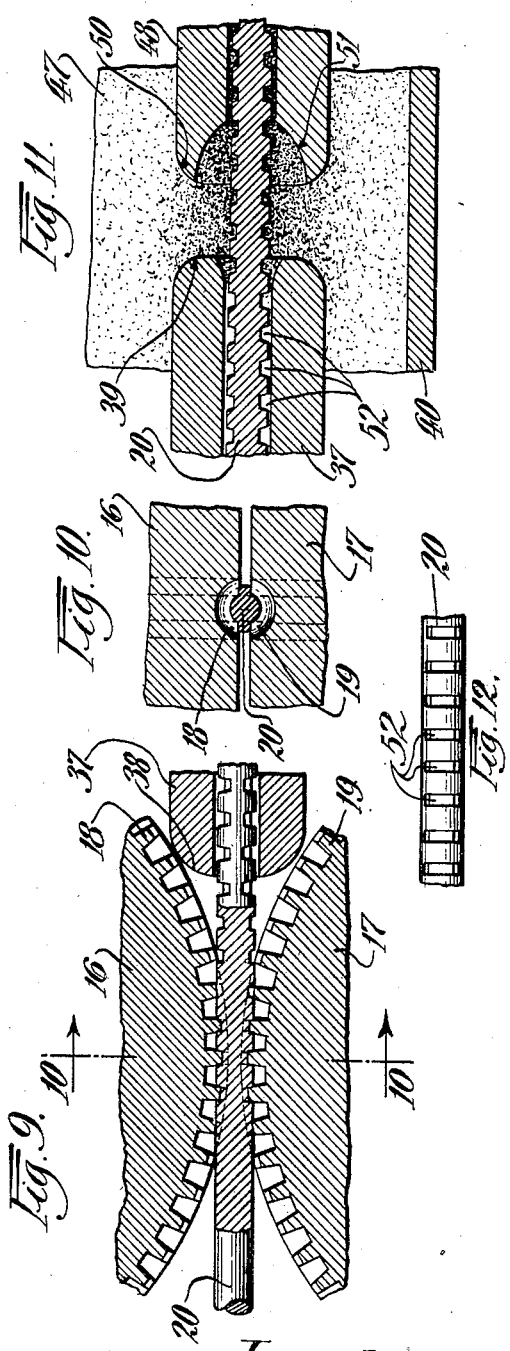

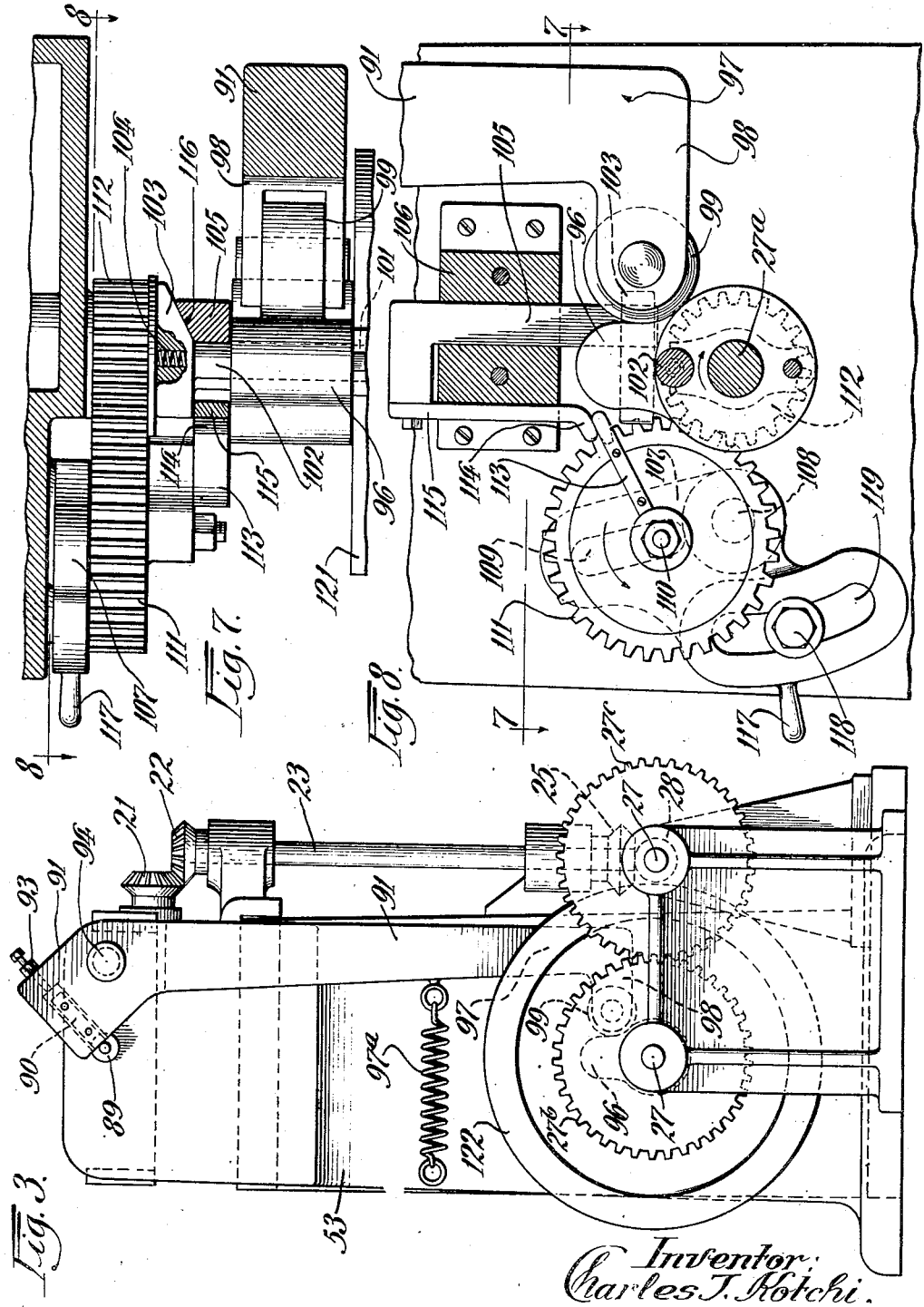

Oct. 9, 1934.  C. J. KOTCHI  1,976,026
METHOD OF MANUFACTURING FLUX CARRYING RODS OR WIRE
Original Filed Oct. 31, 1927  4 Sheets-Sheet 4
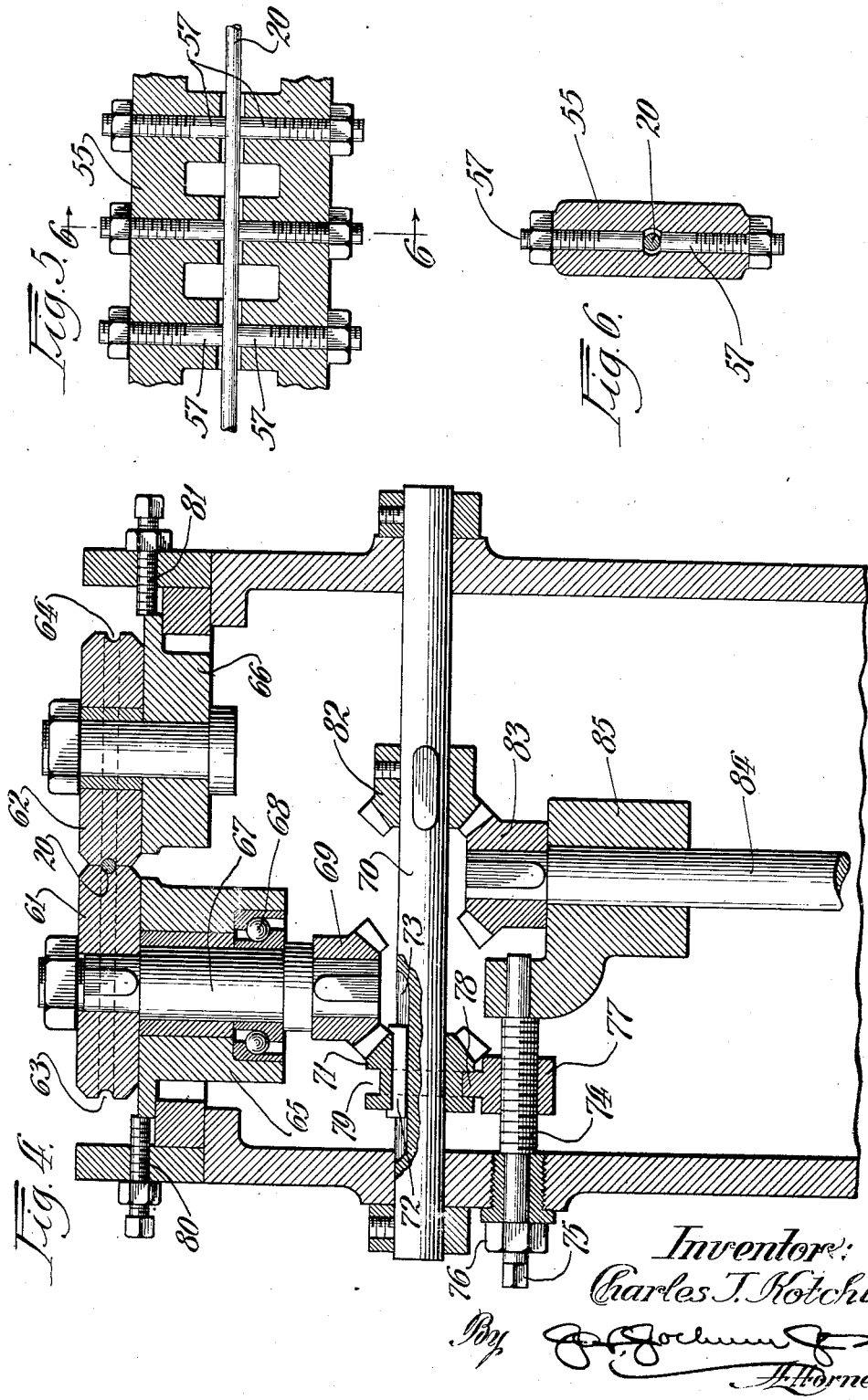

Patented Oct. 9, 1934

1,976,026

UNITED STATES PATENT OFFICE 1,976,026

METHOD OF MANUFACTURING FLUX CARRYING RODS OR WIRE

Charles J. Kotchi, Chicago, Ill., assignor, by mesne assignments, to Una Welding Inc., Cleveland, Ohio, a corporation of Delaware Original application October 31, 1927, Serial No. 229,851, now Patent No. 1,702,304, dated February 19, 1929. Divided and this application January 18, 1929, Serial No. 333,319

6 Claims. (Cl. 219—8)

This application is a division of original application Serial Number 229,851, filed October 31, 1927, since matured into Patent No. 1,702,304 dated February 19, 1929, and one of the objects of the present invention is to provide an improved method for manufacturing rods or wire for welding purposes and the like, and in which rod or wire is incorporated a flux so that as the rod or wire is used and consumed flux in predetermined quantities will be automatically supplied to the work, the rod or wire and flux dropping off in the form of pellets, whereby a continuous operation may be performed by the use of such rod or wire and the necessity of stopping the work or withdrawing the rod or wire from the puddle to supply a quantity of flux will be obviated.

A further object is to provide an improved method for supplying the flux to the rod or wire and for packing the flux in the cavities or recesses in the rod.

To the attainment of these ends and the accomplishment of other new and useful objects as will appear, the invention consists in substantially the method hereinafter more fully described and claimed, in connection with the accompanying drawings.

This method may be carried into operation by any suitable mechanism or machine but in order that the method may be fully understood, there is shown and described one form of machine which is adapted for carrying the invention into operation.

In the drawings:

Figure 1 is a vertical longitudinal sectional view of a machine of this character constructed in accordance with the principles of this invention.

Figure 2 is a top plan view of Figure 1.

Figure 3 is a right hand end elevation of Figure 1.

Figure 4 is an enlarged detail vertical sectional view taken on line 4—4, Figure 1.

Figure 5 is a vertical sectional view taken on line 5—5, Figure 2.

Figure 6 is a sectional view taken on line 6—6, Figure 5.

Figure 7 is a view taken on line 7—7, Figure 8, with parts broken awa. and parts in section.

Figure 8 is a view taken on line 8—8, Figure 7.

Figure 9 is an enlarged detail sectional view of a portion of the knurling wheels and showing the manner in which the rod is knurled and supported.

Figure 10 is a detail sectional view taken on line 10—10, Figure 9.

Figure 11 is an enlarged detail sectional view showing the manner in which the knurled rod is guided through the flux tank and the means whereby the flux is packed within the cavities or recesses in the rod.

Figure 12 is a detail top plan view of a portion of the completed rod.

In the machine shown in the drawings which is particularly adapted for carrying the present invention into operation, the numeral 15 designates a support of any suitable character upon which are mounted suitable bearings for rotatably supporting knurling wheels 16—17. These wheels are respectively provided with spaced teeth 18—19 and between which wheels the rod or material 20 is passed. The wheels 16—17 are disposed one above the other. One of the wheels, preferably the upper wheel, rotates freely and the lower wheel 17 is preferably driven through the medium of intermeshing gears 21—22, one of which is connected with the wheel 17 and the other to an upright shaft 23, the shaft 23 being journaled in a suitable bearing 24. The shaft 23 is driven by suitable intermeshing gears 25—26, the gear 26 being connected to a shaft 27 which is journaled in suitable bearings 28. The shaft 27 is driven from a shaft 27$^a$ on which a gear 27$^b$ is secured for rotation therewith and this gear 27$^b$ meshes with a gear 27$^c$ which is turn is secured to the shaft 27. The shaft 27$^a$ is journaled in suitable bearings 27$^d$—27$^e$.

The shaft 27$^a$ is driven by means of a gear 29 which meshes with a gear 30, the latter being connected with a shaft 31 that is driven from a motor 32 preferably mounted upon a base 33, the shaft 31 being journaled in suitable bearings 34—35.

A guide 36 is provided in alinement with the bite of the indenting or recessing wheels 16—17 and through which guide 36 the wire or rod 20 passes. Another guide 37 is arranged on opposite sides of the wheels 16—17 and the forward extremity of the guide 37 extends for a considerable distance into the bite of the wheels 16—17 as at 38 (see particularly Figure 9), so as to support the rod or work 20 as it emerges from the bite of the wheels 16—17 and at a point in close proximity to the wheels.

The guide 37 is supported in any suitable manner and may be of any desired length. The other end 39 of the guide 37 projects into a flux tank 40, the latter being supported preferably above the support 15 by means of another support 41 whereby a burner or heater 42 which receives its supply of fuel through a pipe 43, may be disposed beneath the tank 40 so as to keep the contents of the tank warm. The tank 40 is disposed within and spaced from an outer tank 44 to form a liquid space 45 between the tanks, and the end 39 of the guide 37 projects through both of the tanks and into the innermost tank 40, suitable packing 46 being provided to form a liquid tight joint.

Within the tank 40 is a flux 47.

An additional guide 48 is supported by the walls of the tank 40—44, suitable packing material 49 being provided to form a fluid tight joint. The extremity 50 (see particularly Figure 11) of the guide 48 projects into the tank 40 and terminates in close proximity to the extremity 39 of the guide 37, but terminates short therefrom so as to permit the flux 47 in the tank or container 40 to be disposed between the extremities 39 and 50 of the respective guides 37 and 48 to fill the rod or work 20 as it passes through the tank 40.

The end 50 of the guide 48 within the tank 40 is concaved or recessed as at 51, the walls of the recess or cavity converging from the extremity 50 of the guide inwardly and toward the diametric center thereof.

As the rod or work 20 passes between the rolls 16 and 17 the teeth 18 and 19 co-operating will operate upon the rod to form cavities 52 therein, and these cavities are formed by an extruding process, the teeth 18 and 19 being so shaped and arranged as to provide cavities which are out of communication with each other.

With this method of producing the cavities in the rod the portion of the material of the rod between adjacent cavities will be compressed or crystallized, with the result that during the consumption of the rod in use, the arc will form a crater or cavity in the end of the rod, with the further result that the "spit and sputter" usually present when welding rods are used, will be obviated.

Further, this construction of rod renders it possible to more readily control the arc and enable the operator to localize the same.

As the rod with the cavities or recesses 52 therein passes out of the guide 37, through the tank 40 and into the guide 48 the flux 47 in the tank 40 will enter the cavities 52 in the rod. The rod as it advances will cause the flux to advance with it and the inclined or tapered surface 51 of the cavity in the end of the guide 48 serves as a means for compacting and pressing the flux into the cavities 52, thereby insuring that the cavities will be filled.

Arranged adjacent the support 15 is a standard or frame 53 having spaced bearings 54 at the top thereof in which a straightening head 55 is rotatably mounted by journaling the ends 56 of the head in the bearings 54. The straightener 55 and the ends 56 are provided with an opening therethrough in alinement with the opening of the guide 48 so that as the wire leaves the guide 48 it will pass into the opening in the head 55. Oppositely disposed pairs of screws 57 are adjustably mounted in the straightener 55 and the proximate extremities of adjacent screws 57 are arranged in alinement and contact with the rod or work 20 for straightening the rod as it passes through the straightener 55. These screws 57 may be adjusted as desired and the ends of the screws also serve as a means for removing or scraping from the rod 20 any excess flux.

The straightener 55 is axially rotated preferably from the shaft 31 through the medium of a pulley 58 secured with the shaft 31 for rotation therewith and a pulley 59 secured to the straightener 55, a belt 60 passing over the pulleys 58 and 59.

Supported preferably by the standard or frame 53 and rotatable upon vertical axes are feeding rollers 61—62. The rollers are provided respectively with grooves 63—64 in their peripheries and the rod or work 20 passing into the bite of these rollers will enter the grooves 63 and 64, the rollers 61 and 62 frictionally binding upon the work or rod and operating to draw or feed the same forwardly.

The rollers 61—62 are respectively mounted in adjustable bearings 65—66 whereby they may be adjusted to compensate varying diameters of the work.

The roller 62 rotates freely while the roller 61 is preferably positively driven. To that end the shaft 67 of the roller 63 is mounted in a ball bearing 68 and secured to the shaft 67 is a gear 69. Mounted upon a shaft 70 is a gear 71 which meshes with the gear 69 and the gear 71 is adapted to be freely adjusted upon the shaft 70 in a direction lengthwise of the axis of the shaft, in any suitable manner, preferably by means of a pin or key 72 which slides in a keyway 73 in the shaft 70. An adjusting screw 74 provided with an adjusting head 75 and a lock nut 76 is provided and is rotatably supported in suitable bearings. Carried by the screw 74 is a collar 77 having a projection 78 which enters a groove 79 in the hub of the gear 71.

By adjusting the screw 74 the gear 71 may be adjusted lengthwise of the shaft 70 so that another gear of different diameter may be substituted for the gear 69. The roller 61 is adjustable by means of a screw 80 and the gear 62 is adjustable by means of a screw 81.

Motion is imparted to the shaft 70 by means of a gear 82 secured thereto which meshes with a gear 83 secured to a shaft 84 that is journaled in suitable bearings 85—86. Connected also with the shaft 84 for rotation therewith is a gear 87 that meshes with a gear 88, which in turn is secured to the shaft 27ª for rotation therewith.

Thus it will be seen that the indenting or recessing rolls 16 and 17, the straightener head 55 and the feeding rolls 61 will all be operated from the shafts 37 and 31 and in unison.

As the rod or work passes from between the rolls 61 and 62 it will pass through a cutter member 89 with which a cutter 90 mounted upon a lever 91 co-operates for severing the wire or rod into predetermined lengths, and when severed the lengths may drop upon a suitable support as indicated at 92. The cutting element 90 is adjustable upon the end of the lever 91 by means of suitable adjusting means 93 and the lever is pivotally mounted intermediate its ends as at 94 upon the frame or standard 53. The cutting element 89 is removably held in position by means of a fastening device 95.

Loosely mounted upon the shaft 27ª is a cam element 96 and the end 97 of the lever 91 is disposed adjacent the path of movement of the cam 96. The extremity 97 of the lever is preferably deflected as at 98 and an anti-friction roller 99 is journaled upon the deflected portion to be engaged by the cam 96 under predetermined conditions to rock the lever 97 in one direction and thereby effect a severing of the rod or work into predetermined lengths, the lever 91 being returned preferably by means of a suitable spring 97ª, and against the stress of which spring the cam 96 rocks the lever.

Connected also with the shaft 27ª is a clutch member 100 provided with a recess 101 opening through one face thereof to receive a pin 102, which latter is carried with the cam member 96 and for free movement laterally with respect thereto. The pin 102 is provided with a flange 103, and a spring 104 tends normally to project the end of the pin 102 beyond the cam member 96 so as to enter the recess 101 and thereby lock the cam member 96 through the medium of the clutch member 100 with the shaft 27ª for rotation therewith. A vertical movable pin or member 105 is mounted to slide loosely in a guide 106 and this pin or member 105 is adapted at a predetermined time in the cycle of operation of the machine, to assume a position to be engaged by the cam shaped flange 103 (see Figure 7) to withdraw the pin 102 from the clutch member 100 and thereby release the cam member 96 with respect to the shaft 27ª. When this operation is effected the lever 91 will remain idle.

A support 107 is pivotally mounted as at 108 adjacent the cam member 96. The support is provided with a slot 109 in which a bearing 110 carrying a gear 111 is adjustably mounted. This gear 111 meshes with a gear 112 carried by the shaft 27ª. Carried by the gear 111 is an arm 113 which is adapted to engage a shoulder 114 on a member 115 that is secured to the member or pin 105 so that when the gear 111 is rotated under predetermined conditions the arm 113 will engage the projection 114 that is connected with the pin 105 to raise the latter out of engagement with the flange 103 of the pin 102 thereby allowing the spring 104 to project the pin 102 into the recess 101 for locking the cam 96 for rotation with the shaft 27ª to rock the lever 91.

As soon as the arm 113 passes out of engagement with the shoulder 114 on the member 105, the latter will drop and a beveled surface 116 (see Figure 7) on the member 105 will engage the beveled surface on the flange 103 and thereby withdraw the pin 102 from the recess 101 in the clutch member 100, thereby unlocking the cam with respect to the shaft 27ª.

The oscillation of the lever 91 in this manner will sever the rod 20 into predetermined lengths and the lengths of the portions severed are governed by the diameter of the gear 101.

By removing the gear 111 and substituting therefor another gear of a different diameter a different length portion will be severed from the rod. The interchanging of gears may be readily effected as the slot 109 in the support 107 will permit gears of different diameters to be supported thereby and by swinging the support 107 about its pivot 108 through the medium of the handle 117 the varying sizes in the interchanged gears 101 may be compensated.

The support 107 may be held in its adjusted position by means of a suitable fastening device 118 passing through a slot 119 and engaging a suitable support.

Connected with the cam member 96 is a brake wheel 120 with which a band brake 121 co-operates to prevent overthrow of the parts.

If desired a fly or balance wheel 122 may be connected with the clutch member 100.

Suitable scrapers 123 (see Figure 2) may be provided, if desired, for maintaining the peripheries of the wheels 61 and 62 free from fluxing material.

With this improved method it will be manifest that there will be provided a continuous operation in the manufacture of the rod or wire, as the rod or wire when inserted into one end of the machine will, through its course through the machine, be shaped or recessed to produce the desired cavities, the cavities will be filled with flux and the flux compacted therein, the wire or rod will be straightened and the excess flux will be scraped therefrom and finally the rod will be severed into sections of predetermined lengths.

With this improved method the cavities will be formed in the rod or wire by extruding the metal thereof to compress the material between adjacent cavities, with the result that during the consumption of the rod or wire a crater will be formed in the end of the rod which localizes the arc and gives the operator a better control and a penetration by the arc. This is due to the compressing and crystallization of certain portions of the rod.

While the preferred method of producing the rod or wire has been herein described, it is to be understood that various changes may be made in the details and in the steps of carrying this method into operation, within the scope of the claims, without departing from the spirit of this invention.

What is claimed as new is:—

1. The method of manufacturing flux carrying welding rods which consists in forming in the rod open and disconnected cavities and compressing the material of the rod between adjacent cavities, then passing the rod through a quantity of flux to fill the cavities, and then scraping off the surplus flux from the portion of the rod between the cavities.

2. The method of manufacturing flux carrying rods or wire which consists in finally shaping the rod by forming cavities therein by extruding the metal thereof to compress the material between adjacent cavities, then supplying flux in said cavities, and then removing the surplus flux from the rod to cause the rod between the cavities to be bare.

3. The method of manufacturing flux carrying rods or wire which consists in finally shaping the rod by forming cavities therein, then filling and compacting flux in said cavities, and then removing surplus flux from the rod to cause the surface of the rod between the cavities to be bare.

4. The method of manufacturing flux carrying rods or wire which consists in forming cavities in the rod, then passing the rod through a supply of flux to fill the cavities with flux, and then removing surplus flux from the rod to cause the surface of the rod between the cavities to be bare with exposed portions of flux between such bare surfaces.

5. The method of manufacturing flux carrying rods or wire which consists in forming cavities in the rod, then passing the rod through a supply of flux to fill the cavities with flux and compact the flux therein, and then removing surplus flux from the rod to cause the surface of the rod between the cavities to be bare with exposed portions of the flux between such bare surfaces.

6. The method of manufacturing flux carrying welding rods which consists in first forming cavities in the rod by extruding the metal thereof to compress the material between adjacent cavities to form a solid centrally disposed core of substantial diameter extending throughout the length of the rod with the cavities opening through the periphery of the rod and with the core intermediate adjacent cavities, then applying flux in said cavities, the flux in the finished product being substantially flush with the adjacent portion of the periphery of the rod, and then scraping off the surplus flux from the portion of the periphery of the rod between the cavities.

CHARLES J. KOTCHI.